Jan. 5, 1960          E. J. ROTH          2,919,824
TRAY OR SCREEN FOR PROOFING AND COOLING BAKERY PRODUCTS
Filed Nov. 12, 1957
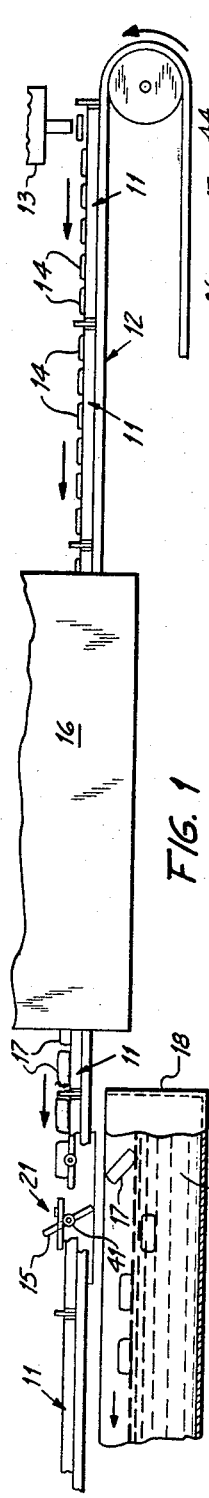
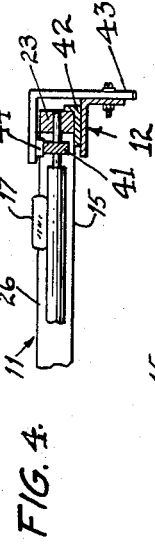
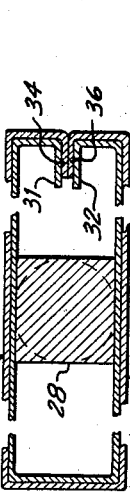
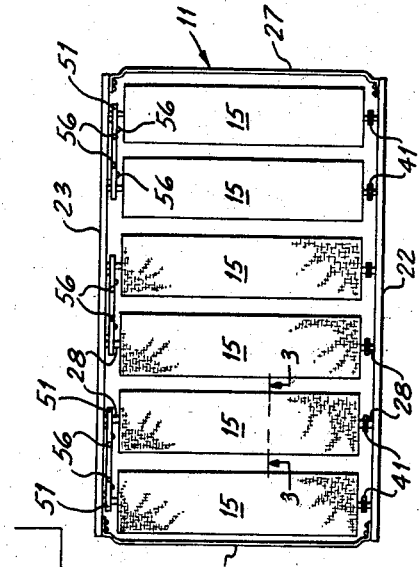
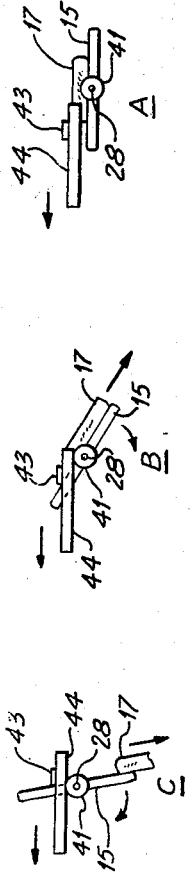
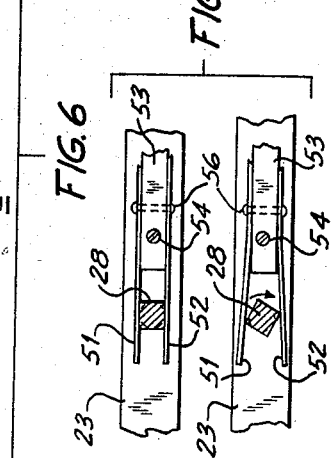
INVENTOR.
ERNEST J. ROTH
BY
ATTORNEY United States Patent Office 2,919,824
Patented Jan. 5, 1960

2,919,824

TRAY OR SCREEN FOR PROOFING AND COOLING BAKERY PRODUCTS

Ernest J. Roth, Rockleigh, N.J., assignor to Joe Lowe Corporation, New York, N.Y., a corporation of Delaware Application November 12, 1957, Serial No. 695,667

6 Claims. (Cl. 214—312)

The present invention relates generally to a baker's tray or screen, and it has particular relation to improvements in such trays or screens having self-contained mechanism for automatically unloading or dumping their contents.

There are many different kinds of baker's trays or screens on the market, but most of them are nothing more than a large flat pan into which a plurality of raw dough pieces may be deposited for proofing or baked products may be deposited for cooling. Such trays or screens are generally of a substantially uniform size for use interchangeably with other trays or screens on standard conveyor operations. The aforementioned trays or screens have no automatic features for unloading their contents, which are either removed manually or the entire tray is turned over to dump the contents therefrom.

An object of the present invention is to provide an automatic reversible baker's tray or screen that may be used with conventional trays or screens for proofing or cooling of bakery products, and, while it has novel built-in automatic flipping features for unloading, it is of a simple, durable and inexpensive construction.

Another object of the invention is the provision of a baker's tray or screen which has built-in features for automatically unloading its contents, and which is exceedingly light-in-weight, combined with great strength and rigidity.

A further object of the invention is to provide a simple, durable and inexpensive automatic unloading baker's tray or screen, which is capable of receiving and unloading spaced rows of spaced dough forms at one row at a time.

Another object of the invention is to provide a simple, efficient and inexpensive unloading baker's tray or screen that has no top or bottom, front or back, requiring specific positioning on a conveyor in order to utilize its automatic unloading features.

Other and further objects and advantages of the invention, which result in simplicity, economy and efficiency, will be apparent from the following detailed description, reference being had to the accompanying drawings forming a part hereof, wherein like numerals indicate like parts, in which:

Figure 1 is a fragmentary diagrammatic elevational view, partly in section, illustrating the automatic features of a tray made in accordance with the principles of the invention, the same being used in a continuous doughnut operation;

Figure 2 is a top plan view, on a larger scale, of one of the baker's trays or screens shown in Figure 1;

Figure 3 is an enlarged cross-sectional view of one of the slats of the tray shown in Figure 2, the same having been taken substantially along the line 3—3 thereof, looking in the direction of the arrows;

Figure 4 is an enlarged fragmentary elevational view, partly in section, showing the manner in which the tray may rest upon a conveyor and showing the engagement of its knurled actuating roller with a stationary camming bar mounted on the side of the conveyor;

Figure 5 consists of two views on an enlarged scale of the spring urging means employed to insure that the slats are turned approximately one hundred and eighty degrees with each actuation and return to substantially a horizontal position, the top view showing the tray and spring urging means in its normal position and the bottom view showing the same during its turning position; and Figure 6 is an enlarged series of views to illustrate sequentially the turning of a slat during the unloading operation.

Referring now to the drawings, and particularly to Figure 1 thereof, there is shown diagrammatically a baker's continuous operation for making yeast raised doughnuts, using the trays or screens 11 of the present invention. In this view, the trays or screens 11 are carried along a conveyor 12, which operates intermittently to permit the depositing of raw dough forms 14 on each slat 15 of the tray as it passes under a conventional cutter 13. The loaded trays 11 then pass through a proofer 16, and, upon leaving the proofer, the proof-raised dough forms 17 are ready to be deposited automatically into a conventional cooking vessel 18, containing hot fat 19. Of course, the trays or screens 11 may be used for proofing and/or cooling other types of dough forms. The automatic dumping of the contents of each slat 15 of the trays 11 is caused by frictional engagement of a knurled roller mounted on its supporting shaft with a stationary camming bar member mounted adjacent said conveyor, as will be hereinafter more fully explained. If automatic unloading of the trays or screens of the invention is not required, it will be obvious that such trays may still be used in the same manner as any conventional tray by merely swinging or removing the camming bar member so that the knurled roller of the slat will not be engaged as the tray moves along the conveyor.

Referring now to Figure 2 of the drawings, there is shown in greater detail one complete baker's tray or screen embodying the principles of the invention. This tray or screen 11 comprises a pair of spaced side rails 22 and 23 connected rigidly at their opposite ends by suitable end rails 26 and 27, forming a rectangular frame structure. Mounted within the frame structure 11 in longitudinally spaced relation are a series of transversely extending shafts 28. The intermediate portion of each shaft 28 is square in cross-section and has a hollow slat 15 mounted thereon, which is of a substantial length as compared to its width dimensions and of a substantial width as compared to its thickness dimensions.

The construction of one of the slats 15 is shown in detail in Figure 3. It will be noted that each slat 15 is of a hollow construction, which not only reduces its weight but also provides a suitable passageway for the square cross-sectional shape of the shaft 28 to extend therethrough. Each slat is formed of one piece of material, such as aluminum, plastic or any other suitable material. The slat in the drawings has its opposite ends bent or folded inwardly in spaced relation, as best shown in Figure 3, as indicated at 31 and 32.

Each slat 15 is covered with a piece of fabric 33, which is of a length slightly longer than the outer perimeter of the slat, providing ends 34 and 36 that can be tucked wedgingly between the folded and overlapping ends 31 and 32 of the metal or plastic slat 15. This arrangement provides a tubular sanitary covering for each slat that can be removed easily and quickly, without requiring dismantling of the tray for cleaning, repairing or replacing.

Referring now to Figure 4, there is shown in greater detail the manner in which one end of the shaft 28 is journalled in a recess formed in the side rail 22. The opposite ends of each of the shafts 28 are circular in cross-section for journalling in the respective side rails 22 and 23 in a similar manner. In the end shown in Figure 4, a knurled roller 41 is mounted thereon in a fixed position, as by a key (not shown). This fragmentary view also shows the manner in which the side rails 22 and 23 of the tray 11 slide along a trackway 42 of the conveyor 12. At the place where the doughnuts 17 on the slats 15 are to be discharged gravitationally, there is mounted on the side of the conveyor 12 by means of a suitable supporting bracket 43, a stationary frictionally engaging camming bar 44. When the knurled wheel 41 engages or rides under the camming bar 44, it tends to rotate, as will be hereinafter more fully explained, thereby tilting or rotating its slat 15 to discharge gravitationally the doughnuts 17 positioned thereon.

The opposite ends of the shafts 28, which support the slats 15, are provided with individual spring urging means in the form of a pair of opposed leaf springs 51 and 52, as best shown in Figure 5. The top illustration of Figure 5 shows that the arrangement consists of a main supporting bar 53, having the leaf spring 51 mounted on its top side and a second leaf spring 52 mounted on its bottom side, said springs being in vertical alignment with each other. The main supporting bar 53 is mounted fixedly on the inside of the side rail 23 by means of spaced machine screws 54. The leaf springs 51 and 52 are longer than their respective supporting bar 53, projecting from opposite ends thereof to engage the adjacent shafts of adjacent slats 15. The leaf springs 51 and 52 are fixedly mounted on the supporting bars by means of rivets 56. With this construction only one supporting bar 53 is required for each pair of slats. The springs 51 and 52 tend to restrict the rotation of the shaft 28, and cause it to maintain substantially a horizontal position when not under actuation of its knurled roller 41.

The top illustration of Figure 5 shows the position of the spring urging means when the slat 15 is in its normal horizontal dough receiving and supporting position. The bottom illustration of Figure 5 shows the position of the leaf springs 51 and 52 with respect of the shaft 28 during the flipping or unloading position of its slat 15. These leaf springs 51 and 52 serve to insure that the slats 15 will retain a normal and substantially horizontal position after each flipping or unloading operation.

There is shown in Figure 6, in five illustrations designated A to E, the sequential steps of the operation of turning, flipping or unloading one of the slats 15 gravitationally of its raised dough forms 17. In this operation, it will be noted, that the knurled roller or wheel 41 of each slat 15 is adapted to engage frictionally a stationary camming bar 44 mounted on the side of the conveyor 12 by means of a suitable supporting bracket 43. In the illustration A, the slat 15 and its knurled roller 41 are approaching the stationary camming bar 44 with its proofed doughnut 17 supported in a substantially horizontal plane. In the illustration B, the knurled roller 41 has just contacted or engaged the camming bar 44, and has started to rotate in a clockwise direction, thereby rotating the slat 15 in the same direction since both are fixed to said shaft. In the illustration C, the proofed doughnut 17 has begun its gravitational discharge from its supporting slat 15. It will be noted that the knurled roller 41 is now approximately mid-way of the length of the camming bar 44, whose length must be such that one passage over it will turn the knurled roller through an arc of approximately 180 degrees, thereby reversing the sides of the slats 15 with each operation. In the illustration D, the knurled roller 41 is almost across the camming bar 44 and its slat 15 is closely approaching its normal horizontal position. In the final illustration E, it will be noted that the knurled roller 41 has passed beyond said camming bar 44 and that its slat 15 has now been returned to a normal horizontal position, but with its opposite side facing upwardly for receiving the next deposit of dough forms 14.

It will be noted that the present tray is of an identical construction from either side, and, by installing two camming bars 44, one on each side of the conveyor, there will be no need to arrange them in any specific position. Since with two camming bars 44, one mounted on either side of the conveyor 12, it will make no difference on which side of the conveyor the knurled roller 41 is positioned for operation of the tray 11 as it moves along said conveyor.

Although I have only described in detail and illustrated in the drawings but one form which the invention may assume, it will be readily apparent to those skilled in the art that the same need not be so limited, but that various modifications may be made therein without departing from the spirit thereof.

What I claim is:

1. A baker's tray or screen comprising a rigid frame, a shaft mounted rotatably in said frame, a slat mounted fixedly on said shaft intermediate its ends, said shaft having means adjacent one end for rotating the same, said shaft having means adjacent its opposite end for restricting its rotation and to maintain its slat in a horizontal position.

2. A baker's tray or screen comprising a rigid frame, a shaft mounted rotatably in said frame, said shaft having a slat mounted fixedly thereto intermediate its ends, said shaft having means adjacent one end between the end of its slat and said frame for rotating the same, said shaft having means adjacent its opposite end between the end of its slat and frame to maintain the same in a horizontal position.

3. A baker's tray or screen comprising a rectangular frame, a plurality of longitudinally spaced slats mounted transversely of said frame, said slats being each mounted on a rotatable shaft, each shaft having a roller for rotating its slat, and each shaft having means to maintain said slat in a normal horizontal position.

4. A baker's tray or screen comprising a frame, a plurality of longitudinally spaced slats mounted transversely of said frame, said slats being each mounted on a shaft journalled in said frame, each shaft having a roller adjacent one end for rotating its slat, and each shaft having means adjacent its opposite end for maintaining said slat in a normal horizontal position when not under actuation of said roller.

5. A baker's tray or screen comprising a rectangular frame, a plurality of longitudinally spaced shafts journalled transversely in said frame, each of said shafts having mounted intermediate its ends a slat having a substantial length as compared to its width dimensions, each of said slats having a removable cover, each of said shafts having means for rotating its slat, and each of said shafts having means for maintaining its slat in a normal position when the same is not under actuation of said rotating means.

6. A baker's tray or screen comprising a frame, a plurality of longitudinally spaced shafts journalled transversely in said frame, each of said shafts having mounted intermediate its ends a hollow slat, said slat being of a substantial length as compared to its width dimension, means including a spring mounted adjacent the opposite end of said shaft for maintaining its slat in a normal receiving position when not under the influence of said rotating means.

References Cited in the file of this patent
UNITED STATES PATENTS

| 529,778 | Bullock et al. | Nov. 27, 1894 |
| 1,428,721 | Towne | Sept. 12, 1922 |
| 2,681,727 | Dersch | June 22, 1954 |